UNITED STATES PATENT OFFICE.

ALBRECHT SCHMIDT, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

HIGHLY-BROMINATED INDIGOES AND PROCESS OF MAKING SAME.

No. 916,031.      Specification of Letters Patent.      Patented March 23, 1909.

Application filed December 7, 1907. Serial No. 405,498.

*To all whom it may concern:*

Be it known that I, ALBRECHT-SCHMIDT, Ph. D., a citizen of the Empire of Germany, and residing at Höchst-on-the-Main, Germany, have invented certain Improvements in Highly-Brominated Indigoes and Processes of Making the Same, of which the following is a specification.

I have found that if di-halogenindigoes, for instance, di-bromindigo (obtained by brominating indigo) or for instance, di-chlorindigo (obtained from chloroanthranilic acids of known constitution) or for instance chlorbromindigo (obtained by chlorinating indigo or indigo-white with chlorin or with sulfurylchlorid and further bromination) be treated with an excess of bromin of at least two atoms of bromin above that quantity of bromin which is required for the tetrahalogenation in the cold or while gently heating, green-black, very highly brominated products may be obtained. When treated with agents capable of eliminating bromin, such, for instance, as bisulfite, said products lose part of the bromin, become blue whereby highly brominated dyestuffs result which dye in the vat blue of a greener and clearer tint than the parent dyestuffs.

Example I: If di-bromindigo, obtained by di-brominating indigo, be stirred with an excess of liquid bromin, for instance, 2, 3 or 4 times its weight of bromin, the di-bromindigo turns, while gently heating, into a greenblack product. It is insoluble in carbon tetrachlorid, benzene and the like, pretty readily dissolved, however, by nitrobenzene to a dark green solution. At ordinary temperature already it gradually gives up bromin, more readily on heating, whereupon it becomes blue. When treated with bisulfite in the heat it also turns blue while losing bromin.

Example II: If the mixture in Example I, for instance, a mixture, obtained from 10 parts of di-bromindigo, 30 parts of bromin (with or without addition of 10 parts of phosphoroxy-chlorid) be gently heated for instance for some time to 50–80° C. there is also obtained a greenish-black product of reaction. This still higher brominated product may be isolated by stirring it with carbon tetrachlorid, filtering and subsequent washing with carbon tetrachlorid. It contains bromin or bromin and hydrogen bromid lightly linked; it is green-black, insoluble in the usual solvents and dissolved by cold nitrobenzene partly to a dark green solution. At ordinary temperature it slowly gives up bromin, when heated with a solution of bisulfite the green-black mass turns into a blue paste of a highly brominated indigo which dissolves in concentrated sulfuric acid to a blue solution. The dyestuff thus obtained dyes in the vat clear blue tints. In the manufacture of these green-black, highly brominated products, there may also be used indifferent solvents in limited proportions, such, for instance, as $CS_2$, $CCl_4$. It is essential, however, that bromin predominates or that there be an excess of bromin of at least two atoms of bromin above that quantity of bromin which is required for the tetrahalogenation so that the green-black highly brominated products may form themselves.

Example III: 30 parts of di-bromindigo from indigo are gently heated for a considerable time in a water-bath in a reflux apparatus with 80 parts of bromin, 50 parts of carbon tetrachlorid (with or without addition of some iodin or any of the known bromin carriers in the bromin substitution). The product of reaction is diluted with carbon tetrachlorid, filtered and washed with carbon tetrachlorid. The green-black product thus obtained has similar properties as the product in Example II.

Example IV: If the green-black products thus described be gently heated with neutral or feebly alkaline hydrosulfites, for instance, with the equal proportion of sodium hydrosulfite of 80 per cent. strength in an aqueous feebly alkaline suspension, gray-greenish leuco bodies are obtained which are insoluble in water, soluble in an alkali hydrate solution, dyeing cotton and wool from these solutions blue.

If in the foregoing example for di-bromindigo be substituted di-chlorindigoes or chlorbromindigo, quite similar green-black products are obtained which become blue with bisulfite, dyeing in the vat clear blue tints.

Having now described my invention, what I claim is:

1. The process herein described of making green-black highly brominated products from di-halogenindigoes which consists in treating di-halogenindigoes with an excess of bromin of at least two atoms of bromin above that quantity of bromin which is required for the tetrahalogenation.

2. As new products the green-black highly brominated products, being insoluble in carbon tetrachlorid, yielding with bisulfite blue dyestuffs, yielding with neutral hydrosulfite gray-greenish leuco-compounds insoluble in water and soluble in alkali.

3. As new products, gray-greenish highly brominated leuco compounds, being insoluble in water, soluble in an alkali-hydrate solution, dyeing cotton and wool in these solutions blue.

In testimony, that I claim the foregoing as my invention, I have signed my name in presence of two subscribing witnesses.

ALBRECHT SCHMIDT.

Witnesses:
JEAN GRUND,
CARL GRUND.